May 17, 1960 C. G. RICHNER 2,936,828
TIRE REGROOVING MACHINE
Filed April 18, 1956 4 Sheets-Sheet 1
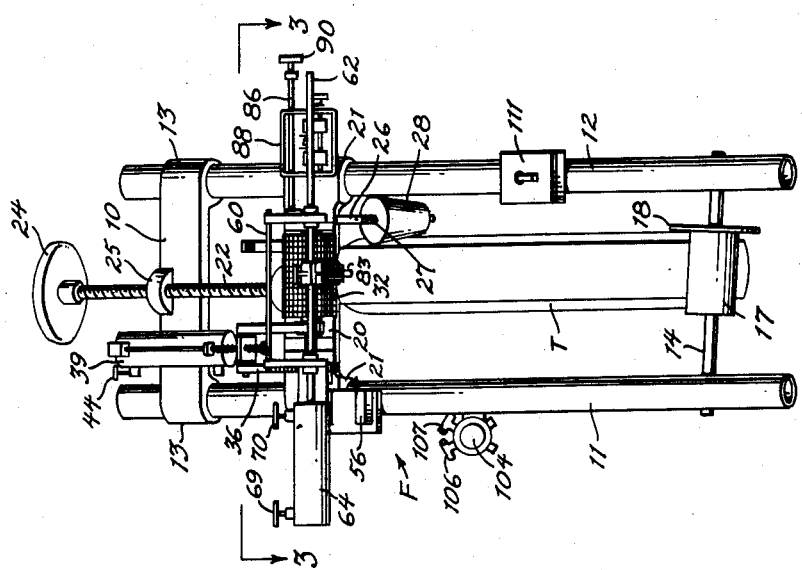
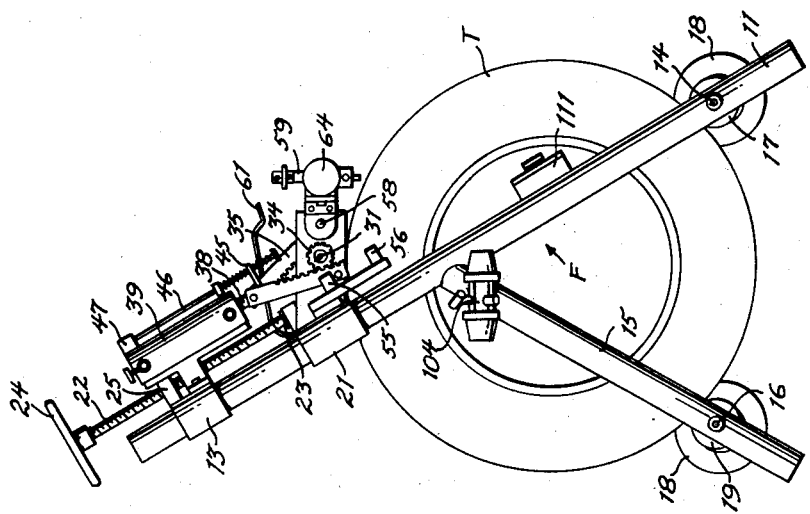
INVENTOR.
CHARLES GORDON RICHNER
BY
ATTORNEY.

May 17, 1960

C. G. RICHNER 2,936,828

TIRE REGROOVING MACHINE

Filed April 18, 1956

INVENTOR.
CHARLES GORDON RICHNER
BY
John A. Robertson
ATTORNEY.

May 17, 1960 C. G. RICHNER 2,936,828
TIRE REGROOVING MACHINE
Filed April 18, 1956 4 Sheets-Sheet 3
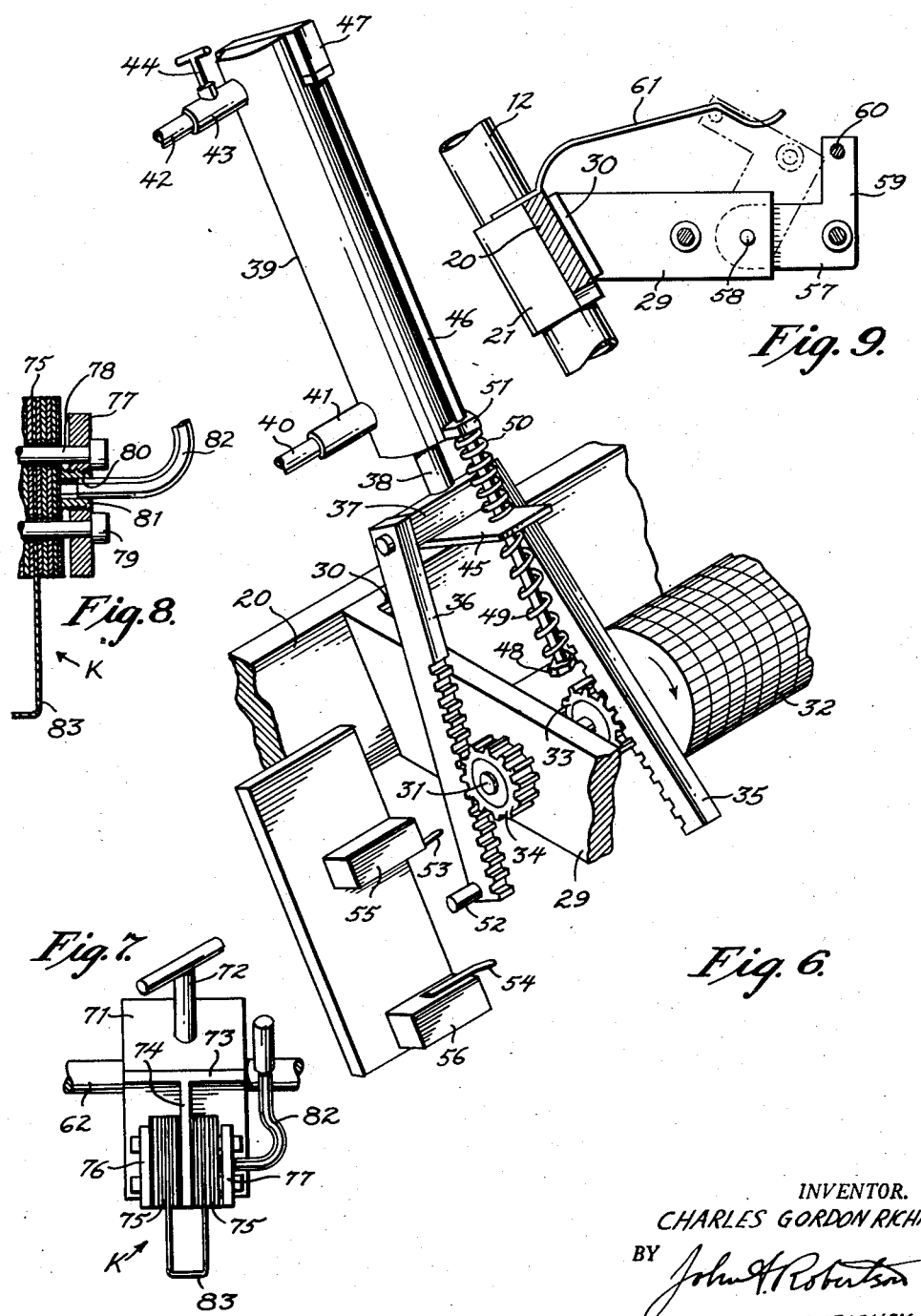
INVENTOR.
CHARLES GORDON RICHNER
BY
ATTORNEY.

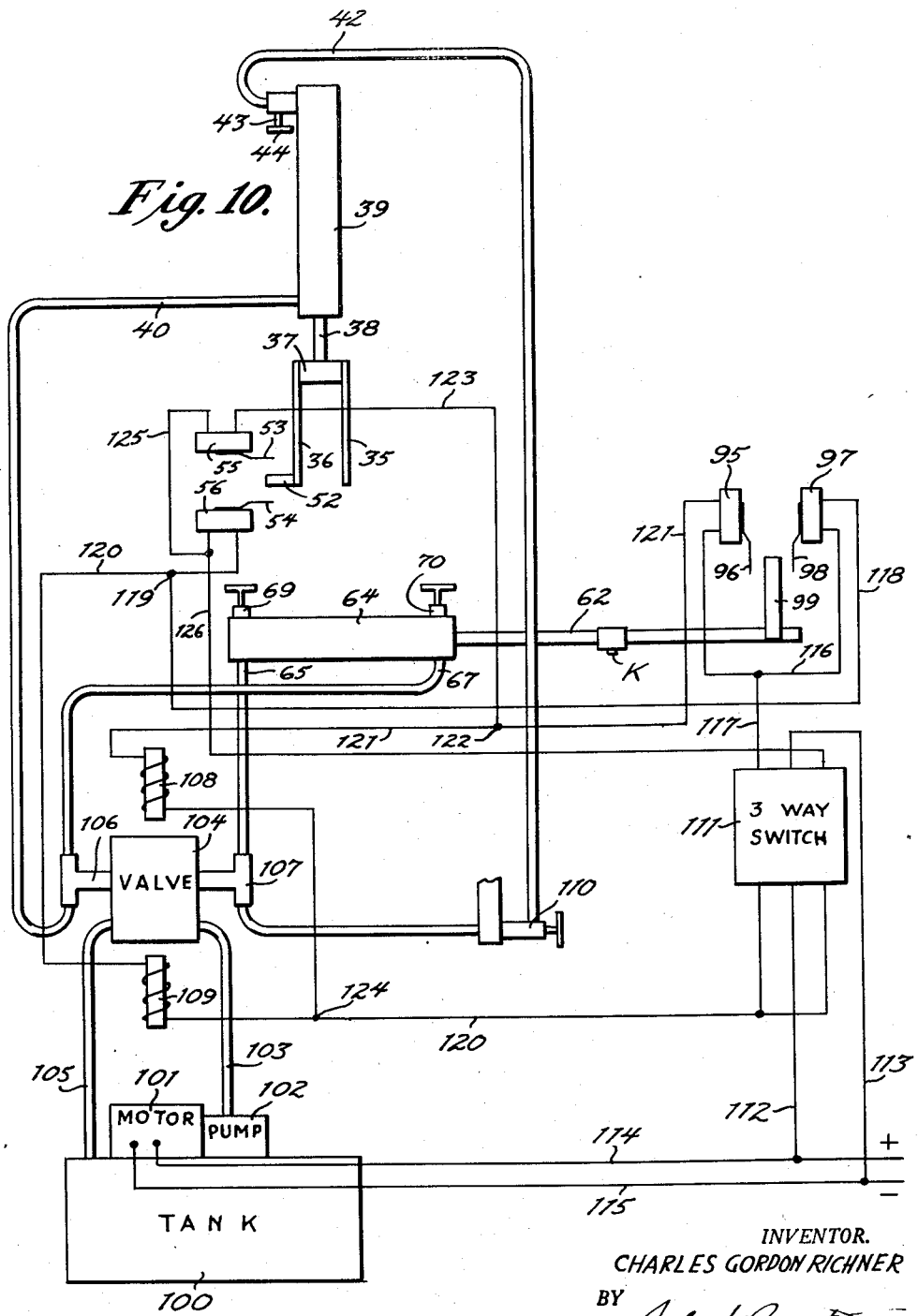

United States Patent Office 2,936,828
Patented May 17, 1960

2,936,828

TIRE REGROOVING MACHINE

Charles G. Richner, Palmyra, N.J.

Application April 18, 1956, Serial No. 579,073

2 Claims. (Cl. 157—13)

The present invention relates to the machines commonly employed for the purpose of cutting grooves in used tires, and is concerned primarily with mechanism for moving the tire being worked on under power during the cutting operation.

At the present time, it is common practice, after the tread of a tire has worn smooth, to recut grooves in the exposed surface to provide, in effect, a new tread. Such grooves ordinarily are either straight or zigzag, depending on the nature of the tread desired. A machine of the type with which this invention is concerned ordinarily comprises a framework in which a tire to be worked upon is adapted to be supported for rotation, together with a knife which engages the tire, and power means for rotating the tire to render the knife effective. If a straight groove is to be cut, the knife is held in a fixed position for that particular groove. On the other hand, if a zigzag or sawtooth groove is to be cut, the knife must be reciprocated from side to side as the tire is driven under power.

With the machines now available, considerable difficulty is being experienced in rotating the tire under power. This action should be positive in every respect, and must be susceptible of accurate control. Moreover, when a zigzag groove is being cut, the tire should be rotated with an intermittent motion so that the tire is momentarily at rest each time the knife reaches one of its side limits of movement; otherwise, a wavy groove will result, which is undesirable as compared to a sawtooth groove having sharp corners.

With the foregoing conditions in mind, the present invention has in view as its foremost objective the provision of a new and improved tire regrooving machine of the character indicated which includes novel means for driving the tire, and which means is positive of operation, accurately controlled, and affords the desired intermittent motion.

More in detail, the invention has as an object the provision, in a tire regrooving machine of the type noted, of tire-driving mechanism which consists essentially of a roller having a roughened surface which engages the tire and which roller is drivable mounted on a shaft. Also mounted on the shaft are two oppositely arranged one-way clutch devices. A hydraulic cylinder-and-piston assembly has its piston operatively connected to these clutch devices so that, as the piston is reciprocated, the roller is rotated with an intermittent motion, and a corresponding movement imparted to the tire.

Still another object is to provide, in a machine of the character aforesaid, a drive for the tire in which each of the one-way clutches includes a pinion, with each pinion meshing with a rack, with the two racks being connected to the piston of the piston-and cylinder assembly.

Still another object of the invention is to provide, in a tire-regrooving machine of the type aforesaid, a knife which is reciprocated from side to side under the influence of a second hydraulic cylinder-and-piston assembly, with the operation of this second cylinder-and-piston assembly synchronized with respect to the first hydraulic cylinder so that, when the knife reaches a limit of movement in one direction, the shaft which drives the roller is at rest. This results in the sharp-angle groove in the tire which is highly desirable.

In a tire-regrooving machine of the type with which this invention is concerned, it is important that the knife be susceptible of accruate positioning for the cutting of each groove. Thus, another object is to provide, in a machine of the character indicated, a knife which is adjustably mounted on its driving rod for a course adjustment, together with the mechanism for providing a fine adjustment.

Still another object in view is to provide a tire-regrooving machine of the type aforesaid in which both the hydraulic cylinders are included in a hydraulic circuit, with the circuit including a solenoid-actuated four-way valve. This valve controls the delivery of the hydraulic medium to the opposite ends of the two cylinders, with the solenoids of the valve being under the control of either one of two sets of limit switches. When one set of limit switches is effective, both of the cylinders are rendered effective. On the other hand, when only the hydraulic cylinder which drives the tire is to be used, the other set of limit switches is effective. In accordance with the present invention, one of these sets of limit switches is associated with the mechanism for reciprocating the knife; while the other set is associated with the hydraulic cylinder for driving the tire.

Still another object of the invention is to provide new and improved means for detachably mounting the knife in position. These knives, which are of U-shaped formation, often become worn and broken and must be replaced from time to time. It is important and highly desirable that the knife itself be easily taken out and replaced by a new one.

Various other more detailed objects and advantages of the invention, such as arise in connection with carrying out the above-noted ideas in a practical embodiment, will in part become apparent and in part be hereinafter stated as the description of the invention proceeds.

The invention, therefore, comprises a tire-regrooving machine which includes as a characteristic element a roller which drivably engages the tire and which roller is rotated with an intermittent motion from a hydraulic cylinder-and-piston assembly through the medium of two one-way clutches. A knife is reciprocated from a second hydraulic cylinder-and-piston assembly, and the operation of the two hydraulic cylinders is synchronized. The invention also embraces other novel, more detailed features.

For a full and more complete understanding of the invention, reference may be had to the following description and accompanying drawings, wherein:

Figure 1 is a view in side elevation of a tire-regrooving machine designed in accordance with the precepts of this invention.

Figure 2 is a view in front elevation of the machine shown in Figure 1.

Figure 6 is an enlarged detailed perspective of one end of the driving roller, the hydraulic cylinder-and-piston assembly therefor, the driving connections between the two, and the limit switch arrangement associated therewith.

Figure 7 is an enlarged detailed elevation of the knife and its mounting.

Figure 8 is a section taken on an enlarged scale through a part of the knife mounting.

Figure 9 is a side view, mostly in elevation, depicting how the carriage for the knife is maintained in an upraised position; and Figure 10 is a diagrammatic view depicting the hydraulic circuit and wiring diagram that is utilized in the machine.

Figures 3, 4, 5:
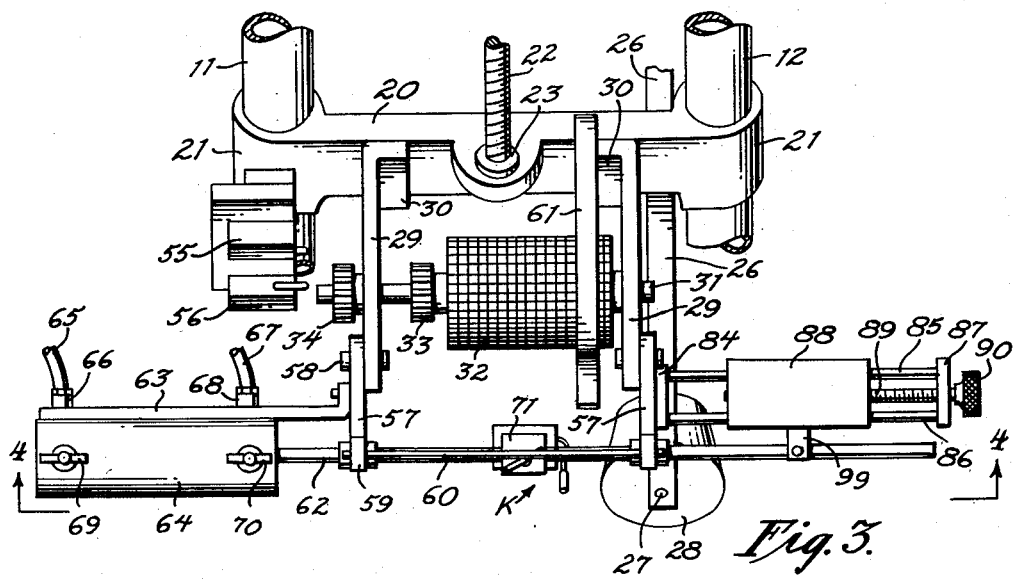
Figure 3 is a top plan view taken on an enlarged scale and with parts omitted. This view illustrates the driving roller and the knife, together with its associated mechanism.
Figure 4 is another view taken on an enlarged scale as a front elevation of the knife and its associated mechanism.
Figure 5 is an enlarged detailed showing of the limit switch arrangement that is associated with the knife.

Referring now to the drawings, wherein like reference characters denote corresponding parts, and first more particularly to Figure 1, the tire-regrooving machine of this invention is therein illustrated as including a framework, which is referred to in its entirety by the reference character F. The framework F comprises two metallic tubular members 11 and 12, which are arranged in the spaced relation depicted in Figure 2 and which are maintained in this relation by a top crossbar 10 having bosses 13 at its opposite ends, with the bosses 13 being formed with openings which receive the members 11 and 12 respectively. Adjacent to the bottom, the members 11 and 12 are connected by a rod 14, which is disposed at a slight angle with respect to the horizontal, for a purpose to be later pointed out.

The frame F also includes a pair of short legs 15, which are secured to the members 11 and 12 substantially midway thereof in any preferred manner, such as by being welded thereto. These legs 15 are also preferably tubular, and are connected adjacent to their lower ends by a cross rod 16 which has substantially the same angle of inclination as the cross rod 14.

A roller 17 is freely journalled on the rod 14, and has flange 18 at the side disposed towards the frame member 12. A second roller 19 is similarly journalled on the rod 16, and has a flange 18 similar to the flange 18 on the roller 17. When a tire, such as shown at T, is positioned in the machine, the inclined disposition of the rollers 17 and 19 will cause the tire to tend to move towards the frame member 12. This aids in the accurate positioning of the tire, as will later become apparent.

A cross head 20 is formed with bosses 21 at its opposite ends. These bosses 21 are formed with passages which slidably receive the frame members 11 and 12. Thus, the cross head 20 is slidably and adjustably mounted on the frame. A screw stem 22 has one end rotatably anchored to the cross head 20, as indicated at 23 in Figure 1; and its upper free end is provided with a handwheel 24. This screw stem 22 passes through a threaded opening in a boss 25 carried by the crosspiece 10. It is evident that the handwheel 24 may be rotated to raise or lower the cross head 20.

An arcuate roller support 26 is secured to the crosshead 20, and extending radially downward therefrom is a pair of stub shafts 27. Rotatably mounted on these stub shafts 27 are conical rollers 28. These conical rollers engage one side of the tire T, as shown in Figure 2, and cooperate with the flanged rollers 17 and 19 in maintaining the tire in position.

*The driving roller*

Referring now more particularly to Figures 3, 6, and 9, a pair of bracket arms 29 extends outwardly from the front face of the cross head 20, to which they are secured through the medium of feet 30, which are welded to the crosshead 20. Extending between these bracket arms 29, in which it is journaled, is a shaft 31. Drivably mounted on this shaft 31 is a driving roller 32 having a surface that is roughened to afford good frictional engagement with the tread of the tire T. A one-way clutch device, which includes a pinion 33, is operatively mounted on the shaft 31 to provide driving movement in the direction of the arrow of Figure 6. A second one-way clutch device, which includes a second pinion 34, is also mounted on the shaft 31 to rotate the roller in the same direction. A rack bar 35 engages the pinion 33; while a second rack bar 36 engages the pinion 34. These rack bars 35 and 36 are pivotally connected at their upper ends to a crossbar 37. The latter is in turn connected to the free end of a piston 38.

The piston 38 is included as a part of a hydraulic cylinder-and-piston assembly, such as shown at 39. A hydraulic conduit 40 is connected to one end of the cylinder 39 by the fitting shown at 41; while a second hydraulic conduit 42 is connected to the upper end of the cylinder 39 by a fitting 43, which may also carry a flow-control valve, shown at 44.

It is evident that, when the hydraulic medium is admitted to the upper end of the cylinder 39 under pressure, the piston 38 is moved downwardly. On the other hand, when the hydraulic medium is admitted under pressure to the lower end, the piston 38 is moved upwardly. In order to achieve an accurately controlled balance in the operation of the piston 38, a tab 45 is connected to the crosspiece 37. A rod 46 extends through an opening in the tab 45 and has its upper end anchored to a lug 47 carried by the cylinder 39. The lower end of the rod 46 is threaded and carries a nut 48. An expansion coil spring 49 is interposed between the nut 48 and tab 45 about the rod 46 below the tab 45; while a second expansion coil spring 50 is disposed about the rod 46 above the tab 45 and bears against the tab 45 at one end and at a stop 51 at the other end, with the stop 51 being carried by the rod 46.

With the two one-way clutch devices being properly arranged, it is evident that, on the downward stroke of the piston 38, the rack bar 35 and pinion 33 are effective to drive the shaft 31 and roller 32 in the direction of the arrow of Figure 6. During this downward stroke, the one-way clutch device associated with the pinion 34 renders the latter ineffective. However, on the up-stroke of the piston 38, the pinion 33 is rendered ineffective, while the pinion 34 becomes effective to continue the drive in the same direction. However, there is a brief pause at the moment when the piston 38 reaches the end of its stroke and the clutch devices change from their effective to ineffective positions, and vice versa.

Needless to say, appropriate guiding structure is provided for maintaining the rack bars 35 and 36 in effective engagement with the pinions 33 and 34. A lug 52 is carried at the lower end of the rack bar 36, from which it outstands, and is adapted for cooperation with contacts 53 and 54 of a pair of limit switches 55 and 56, to be later described.

*The knife*

Referring now more particularly to Figures 3, 4, and 9, a pair of L-shaped brackets 57 is pivotally mounted, as indicated at 58, on the outer ends of the bracket arms 29. These brackets 57 present forward upstanding legs 59 which are connected at the top by a crossrod 60. A catch in the form of a leaf spring 61 has one end anchored to the crosshead 20; and its other end is formed as a detent for engagement with the crossrod 60 to maintain the knife assembly in the upraised position depicted by the broken lines in Figure 9. The lower portions of the legs 59 are formed with openings through which passes a knife rod 62.

A bracket 63 is connected to the outer side of one of the L-shaped brackets 57, as shown in Figure 3; and this bracket 63 carries a hydraulic cylinder 64. The piston (not illustrated) of this cylinder is connected to the knife rod 62. A hydraulic conduit 65 is connected to one end of the cylinder 64 by a fitting 66; while a second hydraulic conduit 67 is connected to the other end of the cylinder 64 by a fitting 68. The cylinder 64 also carries at its opposite ends a pair of valves 69 and 70, which may be closed to take this cylinder out of operation, as will be later pointed out. Between the brackets 57, the knife rod 62 carries a knife assembly, which is referred to in its entirety by the reference character K, and which is shown in some detail in Figures 7 and 8. A knife support 71 is adjustably mounted on the rod 62 and is adapted to be held in an adjusted position by setscrew 72. The knife support 71 includes a cross flange 73, from which depends a central, vertical flange 74. A plurality of shims 75 is disposed on opposite sides of the flange 74 and maintained in assembled relation with respect thereto through the medium of two side plates 76 and 77, which are carried by headed bolts 78 and 79 which pass through openings in the shims 75 and flange 74, respectively. The side plate 77 is formed with a threaded opening 80, in which is received a threaded plug 81 having a central recess adapted to receive the end of an Allen wrench 82. The knife proper is shown at 83 and is of a U-shaped formation. The legs of the U are received between the shims 75, as shown in Figures 7 and 8. When it is desired to remove the knife 83, the Allen wrench 82 is availed of to unscrew or loosen the plug 81. This relieves the pressure on the shims and makes it possible to remove the knife and insert a new one. After the new knife has been positioned, the plug 81 is tightened by the Allen wrench, and the knife 83 is securely held. It is evident that the position of the knife may be adjusted by varying the number of the shims.

Referring now more particularly to Figures 3, 4, and 5, a base plate 84 is shown as secured to the outer side of one of the brackets 57. Outstanding from this base plate 84 is a pair of rods 85 and 86, which are connected at their outer ends by an endpiece 87. A switchbox 88 is slidably mounted on the rods 85 and 86. A screw stem 89 has one end rotatably connected to the switchbox 88; and its other end passes through a threaded opening in the endpiece 87. The screw stem 89 carries an operating member 90 at its free end. Obviously, the member 90 may be rotated to adjust the position of the switchbox 88 as an entirety.

Referring now more particularly to Figures 4 and 5, a turnbuckle screw stem 91 is shown as being mounted within the switchbox 88. This turnbuckle screw stem 91 has oppositely threaded sections 92 and 93. It carries an operating member 94 exteriorly of the switchbox. A microswitch 95 having a contact 96 is mounted on the threaded section 92; while a second microswitch 97 having a contact 98 is mounted on the threaded section 93. An abutment member 99 is secured to the knife rod 62 and is adapted to move between the contacts 96 and 98 of the limit switches 95 and 97. It is evident that the relative distance between the contacts 96 and 98 may be adjusted by rotating the operating member 94.

*Hydraulic and electric circuits*

Referring now more particularly to Figure 10, the hydraulic and electric circuits which control the driving of the roller 32 and the reciprocation of the knife 83 will be described. A tank for an appropriate hydraulic medium is shown at 100. Mounted on this tank 100 is a motor 101 which drives a pump 102. From the pump 102 there extends a conduit 103 to a four-way valve that is represented at 104. A return or drain line from the valve 104 to the tank 100 is shown at 105.

The details of the valve 104 are not here described in detail because such valves are purchasable as such on the open market. It is sufficient to point out that the valve 104 includes a pair of T's 106 and 107 and a movable valve member which is reciprocal under the influence of the solenoids 108 and 109.

It will be noted that the conduit 65 is connected to one side of the T 107; while the conduit 42 is connected to the other side of this T. Likewise, the conduit 67 is connected to one side of the T 106; while the conduit 40 is connected to the other side of the T 106. A control valve 110 may be included in the conduit 42.

A three-way switch is represented diagrammatically at 111. The details of this three-way switch are also herein not illustrated because such switches are well-known and may be purchased as such on the open market. It is sufficient to point out that the switch 111 is connected by lines 112 and 113 to the power lines 114 and 115, the latter extending to the motor 101, as illustrated. One side of each of microswitches 95 and 97 is connected together by a line 116, which is in turn connected to a terminal of switch 111 by a line 117. From the other side of the switch 97, a line 118 extends to a point 119, where it is connected to a line 120. This line 120 is connected to one side of the switch 56 and goes back through the coil of the solenoid 109 to a terminal of the switch 111. Another line 121 is connected to the other side of the switch 95 and extends to a junction point 122, where it is connected to a line 123 that is connected to one side of the switch 55. From this junction point 122 a line 121 is continued through the coil of the solenoid 108 to a junction point 124, where it is connected to the line 120 and hence back to the switch 111.

One side of each of the switches 55 and 56 is connected by a line 125. This line 125 is in turn connected by a line 126 with a terminal in the switch 111.

*Operation*

It will be understood that, with the current turned off, the motor 101 is de-energized and the entire machine is at rest. In this condition, the three-way switch 111 is turned to "Off." Moreover, it is evident that the knife assembly, which is carried by the brackets 57, may be swung upwardly so that the rod 60 engages the spring 61 to maintain the knife assembly upraised. The machine is now in position to have a tire T positioned therein. The tire T is so positioned that it rests against the rollers 28 at the top and the flanges 18 of the rollers 17 and 19 at the bottom. It will first be assumed that it is desired to cut only a straight groove in the tire. In such case, the mechanism which reciprocates the knife should be rendered ineffective. Thus the valves 69 and 70 are closed to take the cylinder 64 out of operation; and the switch 111 is turned to the position which renders the limit switches 95 and 97 ineffective. However, in this position, the limit switches 55 and 56 are effective so that, as the piston 38 is reciprocated, the abutment member 52 alternately engages the contacts 53 and 54 to alternately energize the solenoids 108 and 109. Thus, the hydraulic medium is delivered under pressure to the alternate ends of the cylinder 39 to cause the desired reciprocation thereof.

When the knife is to be reciprocated so as to form a zigzag or sawtooth groove, the knife assembly K is first given a coarse adjustment by loosening the setscrew 72 and moving the support 71 to a desired position on the rod 62, after which the setscrew 72 is tightened. A further fine adjustment may be achieved by availing of the operating member 90 to adjust the position of the switchbox 88 as an entirety. If it is desired to vary the length of the stroke, the distance between the limit switches 95 and 97 may be adjusted through the medium of the operating member 94.

The valves 69 and 70 are opened and the switch 111 moved to the position which renders the limit switches 95 and 97 effective. When the abutment 99 engages one of the contacts 96 and 98, one of the solenoid coils 108 or 109 is de-energized, while the other is energized. This operates the four-way valve so that the hydraulic medium under pressure is delivered to one end of each of the cylinders 39 and 64. When the abutment 99 strikes the other contact, the energization of the solenoids is reversed, which affects the four-way valve to cause the hydraulic medium to be delivered under pressure to the other ends of the cylinders 39 and 64. Thus it is evident that the reciprocating movement of the knife is accurately synchronized with the reciprocating movement of the piston 38 which drives the roller 32. Thus, at the same moment that the knife is at rest, the roller is also at rest. This makes it possible to form the sharp angle sawtooth grooves.

While a preferred specific embodiment of the invention is hereinbefore set forth, it is to be clearly understood that the invention is not to be limited to the exact mechanisms, devices, and circuits illustrated and described, because various modifications of these details may be provided in putting the invention into practice within the purview of the appended claims.

What is claimed is:

1. In a tire-regrooving machine, a supporting frame, means carried by said frame for supporting a tire in position for rotation, a knife mounted on said frame for lateral reciprocation, a hydraulic cylinder-and-piston assembly for reciprocating said knife, under power in opposite directions, a tire-driving roller having a roughened surface adapted to frictionally engage the tread surface of a tire in said frame to rotatably drive the tire while said knife is in operative engagement therewith, a hydraulic cylinder-and-piston assembly for driving said roller with an intermittent motion at the same time said knife is reciprocated, and means for synchronizing the reciprocation of said knife with the intermittent motion of said roller.

2. In a tire-regrooving machine, a supporting frame, means carried by said frame for supporting a tire in position for rotation, a knife mounted on said frame for lateral reciprocation, a hydraulic cylinder-and-piston assembly for reciprocating said knife under power in opposite directions, a tire-driving roller having a roughened surface adapted to frictionally engage the tread surface of a tire in said frame to rotatably drive the tire while said knife is in operative engagement therewith, a hydraulic cylinder-and piston assembly for driving said roller with an intermittent motion at the same time said knife is reciprocated, and a valve controlling the delivery of a hydraulic medium to both said cylinders whereby the reciprocating motion of said knife and the intermittent motion of said roller are synchronized.

References Cited in the file of this patent

UNITED STATES PATENTS

| | | |
|---|---|---|
| 337,973 | Monger | Mar. 16, 1886 |
| 376,467 | Ballew | Jan. 17, 1888 |
| 849,768 | Blake | Apr. 9, 1907 |
| 1,187,629 | Kahler | June 20, 1916 |
| 1,713,488 | Grundmark | May 14, 1929 |
| 1,886,834 | Prentice et al. | Nov. 8, 1932 |
| 1,916,258 | Errig et al. | July 4, 1933 |
| 2,015,635 | Errig | Sept. 24, 1935 |
| 2,116,512 | Ericson | May 10, 1938 |
| 2,164,958 | Stein | July 4, 1939 |
| 2,178,665 | Janowski | Nov. 7, 1939 |
| 2,192,130 | Errig | Feb. 27, 1940 |
| 2,362,967 | Bivans | Nov. 21, 1944 |
| 2,397,863 | Jennings | Apr. 2, 1946 |
| 2,475,117 | Weaver | July 5, 1949 |
| 2,525,929 | Meder | Oct. 17, 1950 |
| 2,529,777 | McInnis | Nov. 14, 1950 |
| 2,566,824 | Carlson | Sept. 4, 1951 |
| 2,594,932 | Judelson | Apr. 29, 1952 |
| 2,713,283 | Lomozzo | July 19, 1955 |
| 2,735,327 | Ritter | Feb. 21, 1956 |